US012462712B2

(12) United States Patent
McDonagh

(10) Patent No.: US 12,462,712 B2
(45) Date of Patent: Nov. 4, 2025

(54) ADHESIVE TAMPER EVIDENT LABEL

(71) Applicant: Gareth James McDonagh, Cardiff (GB)

(72) Inventor: Gareth James McDonagh, Cardiff (GB)

(*) Notice: Subject to any disclaimer, the term of this patent is extended or adjusted under 35 U.S.C. 154(b) by 414 days.

(21) Appl. No.: 17/639,628

(22) PCT Filed: Sep. 1, 2020

(86) PCT No.: PCT/GB2020/052087
§ 371 (c)(1),
(2) Date: Mar. 2, 2022

(87) PCT Pub. No.: WO2021/044130
PCT Pub. Date: Mar. 11, 2021

(65) Prior Publication Data

US 2022/0293015 A1 Sep. 15, 2022

(30) Foreign Application Priority Data

Sep. 5, 2019 (GB) ..................................... 1912812
Nov. 1, 2019 (GB) ..................................... 1915899
(Continued)

(51) Int. Cl.
*G09F 3/02* (2006.01)
*G09F 3/00* (2006.01)
(Continued)

(52) U.S. Cl.
CPC .............. *G09F 3/0292* (2013.01); *G09F 3/10* (2013.01); *G09F 13/16* (2013.01);
(Continued)

(58) Field of Classification Search
CPC .......... G09F 3/0292; G09F 3/10; G09F 13/16; G09F 2003/0208; G09F 2003/0222; G09F 2007/1895; G09F 21/04
See application file for complete search history.

(56) References Cited

U.S. PATENT DOCUMENTS 4,246,307 A * 1/1981 Trautwein ............. G09F 3/0341
283/109
7,166,345 B2 * 1/2007 Myers ................... G09F 3/0292
428/41.9
(Continued)

FOREIGN PATENT DOCUMENTS

GB 2417359 A * 2/2006 ............. B60R 13/10
GB 2523240 A * 8/2015 ............. B60R 13/10
(Continued)

*Primary Examiner* — Cassandra Davis
(74) *Attorney, Agent, or Firm* — Sandy Lipkin

(57) ABSTRACT

The present invention provides an adhesive tamper evident vehicle registration label or an adhesive tamper evident label support. The adhesive tamper evident vehicle registration label comprises a frangible layer of a label comprising an upper surface and an opposed lower surface, in which the frangible layer comprises a plurality of layer portions located adjacent to each other and separable from each other by at least one line of weakness extending between the upper and lower surfaces thereof. The adhesive tamper evident label support comprises a frangible support layer for receiving a label, the frangible support layer comprising an upper surface for receiving a label thereon, and an opposed lower surface, in which the frangible support layer comprises a plurality of support layer portions located adjacent to each other and separable from each other by at least one opening and/or line of weakness extending between the upper and lower surfaces of the support layer. The adhesive tamper evident vehicle registration label or the adhesive tamper evident label support further comprise an adhesive layer
(Continued)

located in use on the lower surface of the frangible layer or frangible support layer and configured to adhere the frangible layer or frangible support layer to a contact surface. The frangible layer of the adhesive tamper evident vehicle registration label or frangible support layer of the adhesive tamper evident label support is moveable between a first untampered position in which the layer portions or support layer portions provide a continuous surface extending across the upper surface thereof, and a second tampered position in which at least a pair of adjacent layer portions or support layer portions are separated from each other along the corresponding at least one opening and/or line of weakness.

5 Claims, 3 Drawing Sheets

(30) Foreign Application Priority Data

Jan. 30, 2020 (GB) ...................................... 2001271
Sep. 1, 2020 (GB) ...................................... 2013689

(51) Int. Cl.
*G09F 3/10* (2006.01)
*G09F 13/16* (2006.01)
*G09F 7/18* (2006.01)

(52) U.S. Cl.
CPC ................ *G09F 2003/0208* (2013.01); *G09F 2003/0222* (2013.01); *G09F 2007/1895* (2013.01)

(56) References Cited

U.S. PATENT DOCUMENTS 8,312,655 B2 * 11/2012 Liu ........................ G09F 3/0292 283/105
10,431,124 B2 * 10/2019 Esmail ...................... G09F 3/02
11,760,069 B1 * 9/2023 Collins ..................... B32B 7/14 428/43
2009/0322538 A1 * 12/2009 Kobren ................. G09F 3/0292 427/258
2020/0111389 A1 * 4/2020 Curnew ................ G09F 3/0292

FOREIGN PATENT DOCUMENTS

GB 2587038 A * 3/2021 ............. B60R 13/10
GB 2591488 A * 8/2021 ............. B60R 13/10
GB 2598392 A * 3/2022 ............. B60R 13/10

* cited by examiner

ADHESIVE TAMPER EVIDENT LABEL

The present invention relates to an adhesive tamper evident label, for example an adhesive tamper evident vehicle registration label, an adhesive tamper evident label support, for example an adhesive tamper evident vehicle registration label support, a method for manufacturing the adhesive tamper evident label, and a method for manufacturing the adhesive tamper evident label support.

BACKGROUND OF INVENTION

Adhesive labels are used in many industries to, for example, label a variety of products such as for example foodstuffs, beverages, medicines, beauty products, etc. Many of these items include anti tamper devices such as seals which break if the item has been tampered with (ie. opened) without authorisation. This provides a clear warning to the consumer that the contents of the item are unsafe and should not be used. There is however a risk that counterfeiters are able to effectively remove the original label from an authentic product and replace the label on to a counterfeit product having a highly similar or identical appearance. This removal and replacement of the original label onto counterfeit products poses a risk for a consumer.

There is therefore a need for an adhesive tamper evident label which provides a clear visible indication that the label has been removed from its original contact surface.

Vehicle registration plates are increasingly copied or stolen from vehicles. The copied or stolen vehicle registration plates are commonly used to sell stolen cars, to disguise cars used in criminal activities (such as for example robberies or theft of fuel from a service station), or to evade speeding fines or parking fines or congestion charges. The owner of the vehicle registration plate may not realise that their vehicle registration plate has been copied until they receive numerous traffic offence penalty notices and charges for vehicle related incidents that they were not responsible for. This places the owner in the difficult position of having to prove that their vehicle was not involved in these instances.

In 2003, the government introduced. The Register of Number Plate suppliers to reduce the number of false number plates on vehicles. This has made it more difficult for criminals to have falsify number plates, however this has led to a sharp rise in the number of plates stolen from vehicles.

There is therefore a need for an adhesive tamper evident vehicle registration label which provides a clear visible indication that the label has been removed from its original contact surface.

SUMMARY OF INVENTION

According to a first aspect of the present invention there is provided an adhesive tamper evident vehicle registration label or an adhesive tamper evident label support, in which the adhesive tamper evident vehicle registration label comprises:

a frangible layer of a label comprising an upper surface and an opposed lower surface, in which the frangible layer comprises a plurality of layer portions located adjacent to each other and separable from each other by at least one line of weakness extending between the upper and lower surfaces thereof; or in which the adhesive tamper evident label support comprises:

a frangible support layer for receiving a label, the frangible support layer comprising an upper surface for receiving a label thereon, and an opposed lower surface, in which the frangible support layer comprises a plurality of support layer portions located adjacent to each other and separable from each other by at least one opening and/or line of weakness extending between the upper and lower surfaces of the support layer; and an adhesive layer located in use on the lower surface of the frangible layer or frangible support layer and configured to adhere the frangible layer or frangible support layer to a contact surface;

in which the frangible layer f=of the adhesive tamper evident vehicle registration label or frangible support layer of the adhesive tamper evident label support is moveable between a first untampered position in which the layer portions or support layer portions provide a continuous support layer extending across the upper surface thereof, and a second tampered position in which at least a pair of adjacent layer portion or support layer portions are separated from each other along the corresponding at least one opening and/or line of weakness.

According to a further aspect of the present invention there is provided a tamper evident adhesive vehicle registration label, preferably a tamper evident adhesive vehicle registration label comprising:

a rear adhesive surface configured to adhere to a contact surface of a vehicle;

an opposed, frangible front layer comprising one or more lines of weakness extending between adjacent portions of the frangible front layer; and an inner layer located between the rear adhesive surface and the front layer, in which the frangible front layer is configured such that unintended tampering with or removal of the label from the contact surface causes fragmentation and/or distortion of the frangible front layer along the one or more lines of weakness to provide a discontinuous front layer enabling at least a portion of the inner layer to be visible therethrough.

The tamper evident label, for example the adhesive vehicle registration label, of the present invention provides an immediate, clear visual indication (in the form of portions of the inner layer being visible through the fragmented and/or distorted lines of weakness of the frangible front layer) that an item to which the adhesive label has been secured to has been tampered with. The visual indication may be in the form of words, images, or hazard symbols.

The frangible front layer is preferably substantially opaque and/or reflective.

In one embodiment, the frangible front layer is configured to be moveable between a first untampered position in which the inner layer is not visible, and a second tampered position in which at least a portion of the inner layer is visible. For example, in the first untampered position, the inner layer is not visible through the at least one line of weakness of the frangible front layer, and in the second untampered position, the at least one line of weakness has been fragmented and/or distorted sufficiently to enable the inner layer to be visible through the at least one line of weakness.

The rear adhesive surface may comprise any suitable adhesive for adhering to a contact surface. In one embodiment, the rear adhesive surface comprises one or more of: a rubber adhesive, an acrylic adhesive or an acrylic blend adhesive, or any combination thereof.

The tamper evident label (for example the adhesive vehicle registration label) may further comprise a removeable release layer configured for contact with the rear adhesive surface. The removeable release layer ensures that the tamper evident adhesive label, for example the tamper evident adhesive vehicle registration label, does not come into unintended contact with a surface prior to use, and thereby ensures that the rear adhesive surface retains its adhesive properties.

In one embodiment, the inner layer may be provided as an integral part of the rear surface or the front layer.

In one embodiment, the frangible front layer has an upper surface and an opposed lower surface. The one or more lines of weakness preferably extend between the upper and lower surfaces of the frangible front layer.

In one embodiment, the one or more lines of weakness may comprise one or more openings and/or indentations and/or scored lines and/or perforated lines, or any combination thereof extending along at least a portion of the surface. The one or more indentations and/or scored lines and/or perforated lines, or any combination thereof may be located at any suitable position along the front layer, for example the one or more indentations and/or scored lines and/or perforated lines, or any combination thereof may be regularly or irregularly spaced apart from each other along the front layer. The one or more indentations and/or scored lines and/or perforated lines, or any combination thereof increase the fragility and/or brittleness and/or reduce the elastic modulus of the front layer thereby aiding fragmentation and/or distortion of the frangible front layer when subjected to tampering.

In one embodiment, the frangible front layer has a first pair of spaced apart, opposed edges, and a second pair of spaced apart, opposed edges. In one embodiment, the frangible front layer may be elongate in shape defining an elongate axis extending between the first pair of spaced apart opposed ends. In one embodiment, the frangible front layer may be substantially rectangular in shape.

In one embodiment, the frangible front layer comprises a plurality of frangible front layer portions located adjacent one or more lines of weakness. The frangible front layer portions are preferably aligned and arranged to provide, in an untampered configuration, a continuous frangible front layer, for example a continuous upper surface of the frangible front layer.

In one embodiment, the frangible front layer comprises a polymeric material, such as polyester. The polymeric material may be imprinted, for example laser printed, with one or more images, wording and/or patterns visible only when the label has been tampered with.

During the process of tampering with or unauthorised removal of the label from the contact surface, the label must be subjected to a force, for example a sheer force or tensile force, greater than the strength of the at least one line of weakness of the frangible front layer and/or the adhesive strength of the rear adhesive surface. The term "adhesive strength" is used herein to refer to the ability of an adhesive to stick to a surface and bond two surfaces together. The adhesive strength is measured by determining the maximum tensile stress needed to detach or unstick the rear adhesive surface in a direction extending within the plane defined by the rear adhesive surface. The strength is measured by determining the maximum tensile stress needed to cause the at least one lines of weakness of the frangible front layer to fragment or distort in a direction extending within the plane defined by the frangible front layer.

In one embodiment, the fragmentations and/or distortions of the at least one lines of weakness may provide openings, for example gaps or slits, between adjacent frangible front layer portions of the discontinuous front layer ensuring portions of the inner layer are visible therethrough. In one embodiment, the frangible front layer comprises one or more lines of weakness extending between adjacent frangible front layer portions, such that on tampering, the frangible front layer is torn along one or more lines of weakness, causing adjacent frangible front layer portions to be separated and enabling at least a portion of the inner layer to be visible therethrough.

The one or more lines of weakness may extend in a direction between an opposed pair of spaced apart ends of the frangible front layer. The one or more lines of weakness may extend substantially between an opposed pair of spaced apart ends of the frangible front layer, or may extend across a portion of the frangible front layer between an opposed pair of spaced apart ends of the frangible front layer. Preferably, the one or more lines of weakness extend in a direction extending at an angle to the elongate axis of the frangible front layer and between an opposed pair of spaced apart ends of the frangible front layer.

In one embodiment, the application of force to the label in order to detach the label from the contact surface may result in the label being stretched in a direction extending along at least one axis, for example in a direction extending along an elongate axis of the label. Stretching of the label in at least one axial direction causes the front layer to fragment and/or distort along the one or more lines of weakness thereof, and thereby providing a discontinuous front layer extending across the label. Such fragmentations and/or distortions may provide openings, for example gaps or slits, along the one or more lines of weakness between adjacent front layer portions of the discontinuous front layer ensure portions of the inner layer are visible therethrough.

In one embodiment, the front layer and/or inner layer may be imprinted with a tamper indicator in the form of for example one or more images, wording and/or patterns.

In one embodiment, in the first untampered position, the front layer provides a continuous surface extending across the entire front layer, and in the second tampered position, the front layer provides a discontinuous surface extending across the entire front layer.

At least one, preferably each, of the rear surface and/or inner layer and/or front layer, or any combination thereof, of the label is composed of polymeric material, for example a polymeric material or a combination of polymeric materials.

In one embodiment, the front layer of the label is composed of a first material (or a first combination of materials) and the inner layer is composed of a second material (or a second combination of materials).

Preferably, the elastic modulus of the first material(s) is greater than the elastic modulus of the second material(s) (i.e. the second material(s) has less resistance to being stretched than the first material(s)). In one embodiment, the elastic modulus of the first material(s) is at least 5%, preferably at least 10%, more preferably at least 25%, for example around 50% greater than the elastic modulus of the second material(s). In one embodiment, the front layer may be composed of a first material (or a first combination of materials) which are substantially inelastic.

The elastic modulus is herein defined as being a measure of an object's (for example a layer's) resistance to being deformed elastically when a stress is applied to it.

In one embodiment, the inner layer has a first pair of spaced apart, opposed edges, and a second pair of spaced apart, opposed edges. In one embodiment, the inner layer may be elongate in shape defining an elongate axis extending between the first pair of spaced apart opposed ends. In one embodiment, the inner layer may be substantially rectangular in shape.

In one embodiment, the inner layer extends substantially across the entire frangible front layer of the label, for example extends between the first pair of spaced apart opposed ends and/or between the second pair of spaced apart opposed ends thereof.

In one embodiment, the inner layer extends substantially across the entire rear adhesive surface and opposed, frangible front layer of the label.

In one embodiment, the inner layer extends across a portion (or a plurality of spaced apart portions), for example a central region, of the rear adhesive surface and/or opposed frangible front layer of the label.

In one embodiment, the inner layer comprises a plurality of spaced apart portions. For example, the inner layer may comprise a plurality of spaced apart portions in the form of markings, such as for example stripes, dots, and/or symbols, and/or in the form of lettering.

In one embodiment, the inner layer is a reflective and/or holographic inner layer comprising one or more reflective and/or holographic portions. The inner layer may be in the form of a reflective and/or holographic tape, for example in the form of a reflective and/or holographic vinyl tape. The inner layer may be in the form of one or more reflective and/or holographic stickers, for example in the form of a reflective and/or holographic vinyl stickers. The inner layer may comprise one or more of prismatic layer and/or glass bead layer.

In one embodiment, the inner reflective and/or holographic inner layer comprises: a carrier film having a metalized layer on the upper surface thereof; and glass beads embedded within the metalized layer. In one embodiment, around 50% of each glass bead is embedded within the metalized layer so as to provide the reflective properties. A further coating layer, preferably a polymer coating layer, is applied over the top of the glass beads and metalized layer to provide the inner reflective and/or holographic layer. The polymer coating layer may comprise one or more of: acrylic and/or polyester (vinyl). The coating layer may be clear, or coloured to provide coloured reflective inner layers.

In one embodiment, the inner reflective and/or holographic layer comprises a prismatic layer comprising an upper surface comprising a prism array formed from one or more of: acrylic and/or polyester (vinyl). Optionally, the upper surface is metalized to enhance reflectivity.

In one embodiment, the label is an adhesive tamper evident vehicle registration label for use on a vehicle. The vehicle may for example be a road vehicle, such as, but not limited to, a car, a van, a lorry, a truck, a moped, a motorbike, a fire engine, an ambulance, or any suitable road vehicle.

The inner layer of the label, for example an adhesive vehicle registration label, is preferably composed of holographic and/or reflective material. Once the adhesive vehicle registration label has been tampered with, portions of the inner layer will be visible. The use of holographic and/or reflective material for the inner layer, improves the visibility of the tampered label in low light conditions, and will make the tampered adhesive label more visible to members of authority, such as for example police, enabling the vehicle to be removed from the roads.

In one embodiment, the adhesive label is a tamper evident adhesive food and/or beverage label.

In one embodiment, the adhesive label is a tamper evident adhesive medication label.

In one embodiment, the adhesive label is a tamper evident adhesive toiletries label.

In one embodiment, the adhesive label is a tamper evident adhesive cosmetic product label.

The label and each of the front and/or rear surfaces and inner layer may have any suitable shape and/or dimensions. In a preferred embodiment, the label and one or more of the front and/or rear surfaces and inner layer may have one or more of the following shapes: square, triangular, rectangular, polygonal, oval, circular, semi-circular, or any combination thereof.

According to a further aspect of the present invention there is provided a method for manufacturing a tamper evident label, for example a tamper evident adhesive vehicle registration label, as described herein comprising:

- obtaining a rear adhesive surface configured to adhere to a contact surface;
- obtaining a frangible front layer comprising one or more lines of weakness extending between adjacent portions of the frangible front layer; and
- obtaining an inner layer and locating the inner layer between the rear adhesive surface and the front layer;
- securing the inner layer in position between the rear surface and the frangible front layer, such that the frangible front layer is configured such that unintended tampering with or removal of the label from the contact surface causes fragmentation and/or distortion of the frangible front layer along the one or more lines of weakness to provide a discontinuous front layer enabling at least a portion of the inner layer to be visible therethrough.

One or more of the rear adhesive surface, inner layer, and/or frangible front layer may be secured in position using adhesive.

In one embodiment, at least two adjacent layers or surfaces, preferably each layer and surface, are secured in position by being subjected to elevated temperatures and/or pressures for a predetermined period of time.

According to a further aspect of the present invention there is provided a kit for a tamper evident adhesive label, for example a tamper evident adhesive vehicle registration label, as described herein comprising:

- a rear adhesive surface configured to adhere to a contact surface;
- an opposed, frangible front layer comprising one or more lines of weakness extending between adjacent portions of the frangible front layer; and
- an inner layer configured to be located between the rear adhesive surface and the front layer,
- in which the frangible front layer is configured such that unintended tampering with or removal of the label from the contact surface causes fragmentation and/or distortion of the frangible front layer along the one or more lines of weakness to provide a discontinuous front layer enabling at least a portion of the inner layer to be visible therethrough.

According to a further aspect of the present invention, there is provided an adhesive tamper evident label support comprising:

- a frangible support layer comprising an upper surface for receiving a label thereon, and an opposed lower surface, in which the frangible support layer comprises a plurality of support layer portions located adjacent to each other and separable from each other by at least one opening or line of weakness extending between the upper and lower surfaces of the support layer; and an adhesive layer configured to extend through the at least one opening or line of weakness to adhere the frangible support layer to a contact surface of an item;

in which the frangible support layer is moveable between a first untampered position in which the support layer portions provide a continuous support layer extending across the upper surface thereof, and a second tampered position in which at least a pair of adjacent support layer portions are separated from each other along or adjacent the corresponding at least one opening or line of weakness.

In one embodiment, the adhesive layer is located at or adjacent the upper surface of the support layer.

Preferably, the adhesive layer is located at or adjacent the upper surface of the frangible support layer to secure a label thereto, and in which the adhesive layer further extends through the at least one opening or line of weakness for adhesion to a contact surface.

In one embodiment, the adhesive layer is located at or adjacent the upper surface of the support layer, and during securing the label support to a contact surface, the adhesive layer extends through the at least one opening or line of weakness of the frangible support layer to adhere to the contact surface.

In use, the adhesive tamper evident label support is secured to a contact surface, for example a bumper of a vehicle, by the adhesive layer, in which the frangible support layer is in the first untampered position. If the label support is tampered with, and force is applied in an attempt to remove the label support from the contact surface, the frangible support layer is moved to the second tampered position in which the support layer fragments or breaks or tears or distorts along or adjacent the at least one opening or line of weakness to provide at least one separated pair of adjacent support layer portions, for example a plurality of separated adjacent support layer portions extending across the upper surface of the support layer. The separation between adjacent support layer portions is preferably increased as measured across the at least one opening or line of weakness. Such fragmentations and/or distortions may provide openings, for example gaps or slits, between adjacent support portions of the frangible support layer providing an immediate, clear visual indication that the label support has been tampered with. Furthermore, as a result of tampering, the label support cannot be re-adhered to a further contact surface due to the separation of adjacent pairs of support layer portions.

The one or more lines of weakness may for example comprise or more of: lines of indentations and/or perforations and/or openings and/or scored lines, or any combination thereof.

The one or more indentations and/or perforations and/or openings and/or scored lines, or any combination thereof may be located at any suitable position along the support layer (for example the upper surface thereof), for example the one or more indentations and/or perforations and/or openings and/or scored lines, or any combination thereof may be regularly or irregularly spaced apart from each other along the support layer (for example the upper surface thereof). The one or more indentations and/or perforations and/or openings and/or scored lines, or any combination thereof increase the fragility and/or brittleness and/or reduce the elastic modulus of the frangible support layer thereby aiding fragmentation and/or distortion of the support layer when subjected to tampering.

During the process of tampering with or unauthorised removal of the label support from the contact surface, the label support may be subjected to a force, for example a sheer force or tensile force, greater than the strength of the material forming the opening or line of weakness between two adjacent support layer portions, i.e. the ability of the material forming the opening or line of weakness(es) to maintain adjacent support layer portions in position adjacent to each other, and/or the adhesive strength of the adhesive of the adhesive layer in contact with the contact surface. The adhesive strength is measured by determining the maximum tensile stress needed to detach or unstick the lower surface of the support layer in a direction extending perpendicular to the plane defined by the support layer.

The upper surface of the frangible support layer is preferably configured to be contacted with and to adhere to a label, for example a vehicle registration plate or label. Tampering with the label support causes the frangible support layer to move to the second tampered position in which the support layer is fragmented to provide separated support layer portions and thereby causing the label located on the upper surface of the frangible support layer to be damaged, for example torn or stretched.

The frangible support layer may be provided as part of a support frame. The support frame preferably comprises a support layer comprising an upper surface and an opposed lower surface, and at least one side portion upstanding therefrom. The side portion(s) may extend outwardly from the support layer. The side portion(s) may extend at any angle to the plane defined by the frangible support layer. For example, the side portion(s) may extend substantially perpendicular to the plane defined by the frangible support layer.

The frangible support layer may define a perimeter edge substantially surrounding the lower surface and/or upper surface thereof. The or each side portion may be upstanding from or adjacent the perimeter edge of at least one of: the lower surface and/or upper surface of the support layer. Preferably, the or each side portion is upstanding from or adjacent the perimeter edge of the upper surface of the support layer. In one embodiment, the label support comprises a frangible support layer and a continuous side portion extending along or adjacent the perimeter edge thereof. At least one line of weakness extends across the upper surface of the support layer and across the side portion. The support frame may comprise a plurality of spaced apart side portions located along or adjacent the perimeter edge of the support layer.

The support frame may comprise a recess defined by the upper surface and the at least one side portion. The recess may be shaped and dimensioned to receive a label therein, for example a vehicle registration plate or label.

In one embodiment, the application of force to the label support in order to detach the label support from the contact surface may result in the label support being stretched in a direction extending along at least one axis, for example in a direction extending between opposed side portions, causing the frangible support layer to fragment and/or distort and thereby providing a discontinuous upper surface to extend across the support layer. Such fragmentations and/or distortions may provide openings, for example gaps or slits, between adjacent portions of the discontinuous upper surface.

The frangible support layer may be composed of any suitable material, such as for example, one or more of: metal and/or plastic material, or any combination thereof. In one embodiment, the frangible support layer is composed of aluminium.

The label support may further comprise a removeable release layer configured for contact with the lower surface of the support layer and/or adhesive layer extending through the at least one opening thereof. The removeable release layer ensures that the adhesive of the adhesive layer does not come into unintended contact with a surface prior to use, and thereby ensures that the adhesive of the adhesive layer retains its adhesive properties.

In one embodiment, the adhesive layer extends substantially across the entire upper surface of the frangible support layer.

In one embodiment, the adhesive layer is located in discrete regions on the lower surface of the frangible support layer.

In one embodiment, the adhesive layer is located in discrete regions on the upper surface of the frangible support layer.

In one embodiment, the adhesive layer extends across a portion (or a plurality of spaced apart portions), for example a central region, of the upper surface and/or lower surface of the frangible support layer.

In one embodiment, the adhesive layer is located at or adjacent the or each opening of the frangible support layer.

In one embodiment, the adhesive layer is located at or adjacent one or more lines of weakness of the frangible support layer.

In one embodiment, one or more of the upper surface of the support layer and/or label affixed to the upper surface of the support layer may be imprinted with a tamper indicator in the form of for example one or more images, wording and/or patterns.

In one embodiment, the upper surface of the support layer comprises a decorative finish providing the registration number of a vehicle. The vehicle may for example be a road vehicle, such as, but not limited to, a car, a van, a lorry, a truck, a moped, a motorbike, a fire engine, an ambulance, or any suitable road vehicle.

In one embodiment, the label support further comprises a label comprising a decorative finish on the front layer thereof.

The label may for example be one or more of:

a vehicle registration label;

a food and/or beverage label;

a medication label;

a toiletries label;

a cosmetic product label.

The label support may for example be one or more of:

a vehicle registration label support;

a food and/or beverage label support;

a medication label support;

a toiletries label support;

a cosmetic product label support.

The label support and/or support layer and/or label may have any suitable shape and/or dimensions. In a preferred embodiment, the label support and/or support layer and/or label may have one or more of the following shapes: square, triangular, rectangular, polygonal, oval, circular, semi-circular, or any combination thereof.

According to a further aspect of the present invention there is provided a method for manufacturing an adhesive tamper evident label support as herein described, the method comprising:

obtaining a frangible support layer comprising an upper surface for receiving a label thereon, and an opposed lower surface, in which the frangible support layer comprises a plurality of support layer portions located adjacent to each and separable from each other by at least one opening or line of weakness extending between the upper and lower surfaces of the support layer, in which the frangible support layer is moveable between a first untampered position in which the support layer portions provide a continuous support layer extending across the upper surface thereof, and a second tampered position in which at least a pair of adjacent support layer portions are separated from each other along the corresponding at least one opening or line of weakness; and obtaining an adhesive layer and securing the adhesive layer to the support layer such that the adhesive layer is configured to extend through the at least one opening or line of weakness to adhere the frangible support layer to a contact surface of an item.

The adhesive layer may be secured to the upper surface of the surface layer.

The method may further comprise obtaining a label and securing the label to the support layer, preferably to the upper surface of the support layer. The label may be secured to the support layer by the adhesive layer and/or be adhesive located on the label itself.

According to a further aspect of the present invention there is provided a kit for an adhesive tamper evident label support as herein described, the kit comprising:

a frangible support layer comprising an upper surface for receiving a label thereon, and an opposed lower surface, in which the frangible support layer comprises a plurality of support layer portions located adjacent to each other and separable from each other by at least one opening or line of weakness extending between the upper and lower surfaces of the support layer, in which the frangible support layer is configured to be moveable between a first untampered position in which the support layer portions provide a continuous support layer extending across the upper surface thereof, and a second tampered position in which at least a pair of adjacent support layer portions are separated from each other along the corresponding at least one opening or line of weakness; and an adhesive layer configured to extend through the at least one opening or line of weakness to adhere the frangible support layer to a contact surface of an item; and optionally a label for adhesion with the support layer.

According to a further aspect of the present invention, there is provided an adhesive tamper evident vehicle registration label comprising:

a frangible inner layer comprising an upper surface and an opposed lower surface, in which the inner layer comprises at least one line of weakness extending between the upper and lower surface thereof;

a first adhesive layer located on the upper surface of the frangible inner layer; and a second adhesive layer located on the lower surface of the frangible inner layer and configured in use to adhere to a contact surface of a vehicle, in which the frangible layer is moveable between a first untampered position in which the layer portions provide a continuous layer extending across the upper surface thereof, and a second tampered position in which at least a pair of adjacent layer portions are separated from each other along the corresponding at least one opening and/or line of weakness.

During the process of tampering with or unauthorised removal of the label from the contact surface, the label must be subjected to a force, for example a sheer force or tensile force, greater than the strength of the one or more lines of weakness. The vehicle registration label of the present invention is therefore configured such that unintended tampering with or removal of the label from the contact surface of a vehicle causes fragmentation and/or distortion of the frangible inner surface along one or more lines of weakness, causing the inner surface to fragment or distort into a plurality of discrete portions, providing a clear visual indication of tampering. Such fragmentations and/or distortions may provide openings, for example gaps or slits, between adjacent portions of the discontinuous inner layer. Fragmentation may be at least partial, for example fragmentation of the at least one line of weakness may occur along at least a portion of the length of the line of weakness. Partial fragmentation along at least one line of weakness may provide distortion of the frangible inner surface.

In one embodiment, the vehicle registration label is configured to be moveable between a first untampered position in which the inner layer is not fragmented or distorted, and a second tampered position in which the inner layer is fragmented and/or distorted along at least one line of weakness. In the first untampered position, the inner layer provides a continuous surface extending across the inner layer, and in the second tampered position, the inner layer provides a discontinuous surface extending across at least a portion of the inner layer.

The one or more lines of weakness may extend between adjacent inner layer portions of the inner layer.

In one embodiment, the one or more lines of weakness may comprise one or more indentations and/or scored lines and/or perforated lines, or any combination thereof extending along at least a portion of the surface. The lines of weakness may be located at any suitable position in any suitable configuration and/or at any suitable orientation on the inner layer. In one embodiment, the lines of weakness may be regularly or irregularly spaced apart from each other along the inner layer, i.e. along the length (i.e. along the longitudinal axis) of the inner layer when measured between opposed transverse edges thereof. In one embodiment, the or each line of weakness extends at an angle to the longitudinal axis of the inner layer. In one embodiment, the or each line of weakness extends substantially between opposed edges, preferably between opposed longitudinal edges, of the inner layer. The lines of weakness increase the fragility and/or brittleness and/or reduce the elastic modulus of the inner layer thereby aiding fragmentation and/or distortion of the frangible inner layer when subjected to tampering.

The first and/or second adhesive layer may be substantially continuous, for example extending continuously across the corresponding surface of the frangible inner layer between at least one opposed sides thereof (preferably between each pair of opposed sides thereof).

The first and/or second adhesive layer may be substantially continuous, and extending across a portion of the surface of the frangible inner layer. In one embodiment, at least one of the first and/or second adhesive layer is substantially continuous and is substantially centrally located on the corresponding surface of the frangible inner layer.

In one embodiment, at least one (for example each) of the first and/or second adhesive layer may be discontinuous. The first and/or second adhesive layer may comprise a plurality of spaced apart, discrete adhesive portions located on the corresponding surface of the inner layer. The plurality of spaced apart, discrete adhesive portions may be provided in any suitable configuration and/or at any suitable location on the corresponding surface of the inner layer. For example, the first and/or second adhesive layer may comprise a plurality of spaced apart, discrete adhesive portions in the form of rows or patches or areas spaced apart and extending across at least a portion of the corresponding surface of the inner layer.

In one embodiment, the first or second adhesive layer comprises at least one, preferably a plurality of spaced apart, discrete adhesive portions located on the corresponding surface of the inner layer. The plurality of discrete adhesive portions of the first adhesive layer may be spaced apart from (in at least one direction extending parallel to an axis extending between opposed sides of the inner layer) the plurality of discrete adhesive portions of the second adhesive layer.

In one embodiment, one or more adhesive portions of a corresponding adhesive layer (for example the first or second adhesive layer) may be located adjacent a corresponding inner layer portion on the corresponding surface of the inner layer.

Preferably, the first adhesive layer and the second adhesive layer are deposited on alternate inner layer portions of the inner layer.

In one embodiment, the label further comprises a plastic outer layer located on the first adhesive layer.

In one embodiment, the adhesive strength of the first and/or second adhesive layers is sufficient such that when a force is applied to the label, for example to the inner layer or plastic outer layer, during removal of the layer from the contact surface, the frangible inner layer fragments along one or more lines of weakness, causing the frangible inner layer to break or separate into a plurality of spaced apart inner layer portions providing a clear indication of tampering.

In one embodiment, the adhesive strength of the first and/or second adhesive layers is sufficient such that when a force is applied to the label, for example to the inner layer or plastic outer layer, during removal of the layer from the contact surface, the frangible inner layer fragments along one or more lines of weakness, causing the frangible inner layer to break or separate into a plurality of spaced apart inner layer portions. After tampering, one or more inner layer portions may remain adhered to the plastic outer layer, whilst one or more inner layer portions may remain adhered to the contact surface of a vehicle, providing a clear indication of tampering.

The term "adhesive strength" is used herein to refer to the ability of an adhesive to stick to a surface and bond two surfaces together. The adhesive strength is measured by determining the maximum tensile stress needed to detach or unstick the rear adhesive surface in a direction extending perpendicular to the plane defined by the rear adhesive surface.

In one embodiment, the application of force to the label in order to detach the label from the contact surface may result in the label being stretched in a direction extending along at least one axis.

In one embodiment, stretching of the label in at least one axial direction causes the inner layer to fragment and/or distort and thereby providing a discontinuous front layer extending across the label. Such fragmentations and/or distortions may provide openings, for example gaps or slits, between adjacent portions of the discontinuous inner layer providing a clear visual indication of tampering.

The first adhesive layer may comprise any suitable adhesive for adhering to an upper surface. In one embodiment, the first adhesive layer comprises one or more of: a rubber adhesive, an acrylic adhesive or an acrylic blend adhesive, or any combination thereof.

The second adhesive layer may comprise any suitable adhesive for adhering to a contact surface of a vehicle. In one embodiment, the second adhesive layer comprises one or more of: a rubber adhesive, an acrylic adhesive or an acrylic blend adhesive, or any combination thereof.

The vehicle registration label may further comprise a removeable release layer configured for contact with the second adhesive layer prior to application to a contact surface on a vehicle. The removeable release layer ensures that the vehicle registration label does not come into unintended contact with a surface prior to use, and thereby ensures that the second adhesive layer retains its adhesive properties.

In one embodiment, the frangible inner layer comprises a polymeric material, such as polyester. The frangible inner layer may be imprinted, for example laser printed, with one or more images, wording and/or patterns. For example, the inner layer may comprise a plurality of spaced apart markings in the form of lettering. In one embodiment, the inner layer may be composed of a reflective material. The inner layer may be opaque and reflective.

At least one, preferably each, of the inner layer and/or outer layer, or any combination thereof, of the label is composed of polymeric material, for example a polymeric material or a combination of polymeric materials.

In one embodiment, the outer layer of the label is composed of a first material (or a first combination of materials) and the inner layer is composed of a second material (or a second combination of materials).

Preferably, the elastic modulus of the first material(s) is greater than the elastic modulus of the second material(s) (i.e. the second material(s) has less resistance to being stretched than the first material(s)). In one embodiment, the elastic modulus of the first material(s) is at least 5%, preferably at least 10%, more preferably at least 25%, for example around 50% greater than the elastic modulus of the second material(s). In one embodiment, the front layer may be composed of a first material (or a first combination of materials) which are substantially inelastic.

The elastic modulus is herein defined as being a measure of an object's (for example a layer's) resistance to being deformed elastically when a stress is applied to it.

The vehicle may for example be a road vehicle, such as, but not limited to, a car, a van, a lorry, a truck, a moped, a motorbike, a fire engine, an ambulance, or any suitable road vehicle.

The label and each of the outer and/or inner layers may have any suitable shape and/or dimensions. In a preferred embodiment, the label and one or more of the front and/or inner surfaces may have one or more of the following shapes: square, triangular, rectangular, polygonal, oval, circular, semi-circular, or any combination thereof.

According to a further aspect of the present invention there is provided a method for manufacturing an adhesive tamper evident vehicle registration label as herein described comprising:

- obtaining a frangible inner layer comprising an upper surface and an opposed lower surface, in which the inner layer comprises at least one line of weakness extending between the upper and lower surface thereof;
- obtaining a first adhesive layer and depositing the first adhesive layer on the upper surface of the frangible inner layer; and
- obtaining a second adhesive layer and depositing the second adhesive layer on the lower surface of the frangible inner layer such that the second adhesive layer is configured in use to adhere to a contact surface.

In one embodiment, the method further comprises obtaining an outer layer and securing the outer layer to the first adhesive layer.

In one embodiment, the first and/or second adhesive layer may be deposited on the corresponding surface of the inner layer in any suitable configuration.

According to a further aspect of the present invention there is provided a kit for an adhesive tamper evident vehicle registration label as herein described comprising:

- a frangible inner layer comprising an upper surface and an opposed lower surface, in which the inner layer comprises at least one line of weakness extending between the upper and lower surface thereof;
- a first adhesive layer configured in use to be located on the upper surface of the frangible inner layer; and
- a second adhesive layer configured in use to be located on the lower surface of the frangible inner layer such that the second adhesive layer is configured in use to adhere to a contact surface.

The kit may further comprise an outer layer configured in use to be located on the first adhesive layer.

Embodiments of the present invention will now be described with reference to the accompanying Figures:

DETAILED DESCRIPTION

Figure 1:
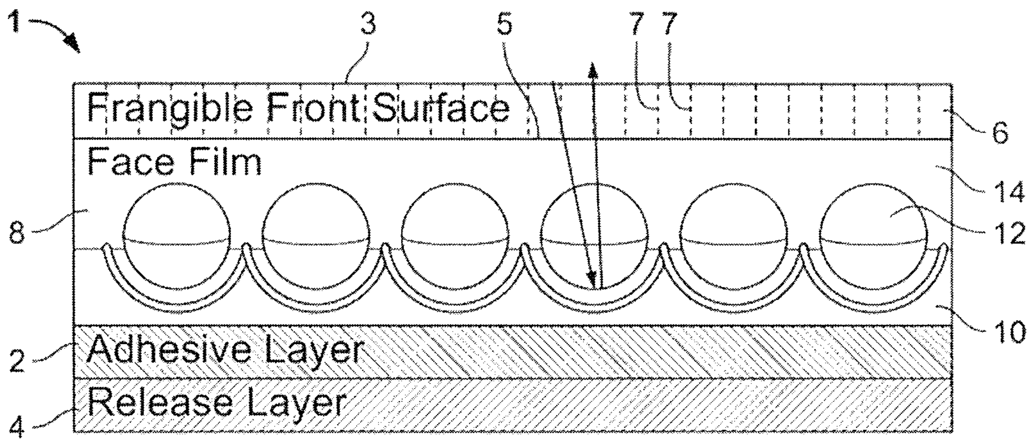
FIG. 1 is a schematic cross-section diagram of an adhesive label according to one embodiment of the present invention.
Figure 2:
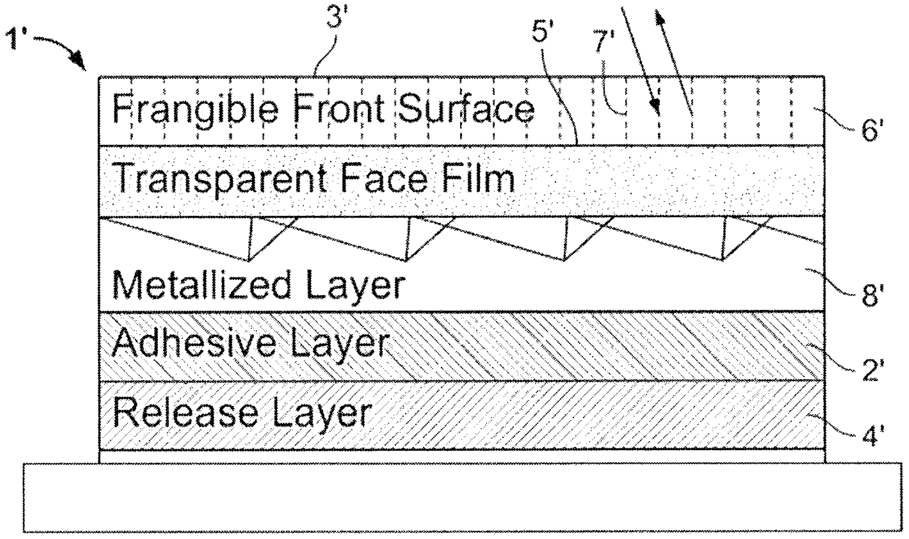
FIG. 2 is a schematic cross-sectional diagram of an adhesive label according to a second embodiment of the present invention.

With reference to FIGS. 1 and 2, the tamper evident adhesive label according to one embodiment of the present invention, in this illustrated embodiment, is an adhesive vehicle registration label 1, 1'. It is however to be understood that the tamper evident label may be used for any suitable purpose and is not to be limited to an adhesive vehicle registration label.

The tamper evident adhesive vehicle registration label 1, 1' comprises a rear adhesive surface 2, 2' comprising a rubber adhesive. The rear adhesive surface 2, 2' is in contact with a removeable release layer 4, 4'. The adhesive label 1, 1' further comprises an opposed, frangible front layer 6, 6' in the form of layer of polyester imprinted (not seen). The frangible front layer 6, 6' comprises a plurality of spaced apart lines of weakness 7, 7' extending between the upper 3 and lower 5 surfaces thereof.

The adhesive label 1,1' further comprises an inner layer 8, 8' located between the rear adhesive surface 2, 2' and the frangible front layer 6, 6'.

In FIG. 1, the inner reflective and/or holographic inner layer 8 comprises: a carrier film 10 having a metalized layer 14 on the upper surface thereof; and glass beads 12 embedded within the metalized layer 14. It can be seen that around 50% of each glass bead 12 is embedded within the metalized layer 14 so as to provide the predetermined reflective properties. It is however to be understood that any suitable percentage of each glass bead may be embedded within the metalized layer in order to provide the desired reflective properties. A further coating layer in the form of an acrylic or vinyl layer 16 is applied over the top of the glass beads 12 and metalized layer 14 to provide the inner reflective and/or holographic layer 8. The coating layer may be clear, or coloured to provide coloured reflective inner layers.

In FIG. 2, the inner reflective and/or holographic inner layer 8' comprises a prismatic layer comprising an upper surface comprising a prism array formed from one or more of: acrylic and/or polyester (vinyl).

In use, the release layer 4, 4' is removed and the adhesive label 1, 1' is adhered to a contact surface, such as for example vehicle. The adhesive label 1, 1' may for example be an adhesive vehicle registration label. The frangible front layer 6, 6' may be decorated with the registration number of the vehicle. A third party may attempt to remove the adhesive label 1, 1' from the vehicle without authorisation. During removal of the adhesive label 1, 1', the label may be subjected to a force or tensile stress greater than the adhesive strength of the rubber adhesive.

During application of tensile stress to the label 1, 1', the frangible front layer 6, 6' may fragment and/or distort along one or more lines of weakness 7, 7' and thereby providing a discontinuous front layer extending across the label. In particular, the frangible front layer 6, 6' may distort to ensure that the imprinted images, wording or patterns on the inner reflective and/or holographic layer 8, 8' are visible therethrough.

The imprinted markings on the inner layer 8, 8' may be clearly visible through the fragmented front layer 6, 6' due to the high reflectivity of the inner layer 8, 8' ensuring that the tampered adhesive label would be immediately recognisable to third parties, such as for example law enforcement officers.

The label 1, 1' of the present invention may therefore be used to provide a label which provides clear, visible indications when the label has been tampered.

Figure 3:
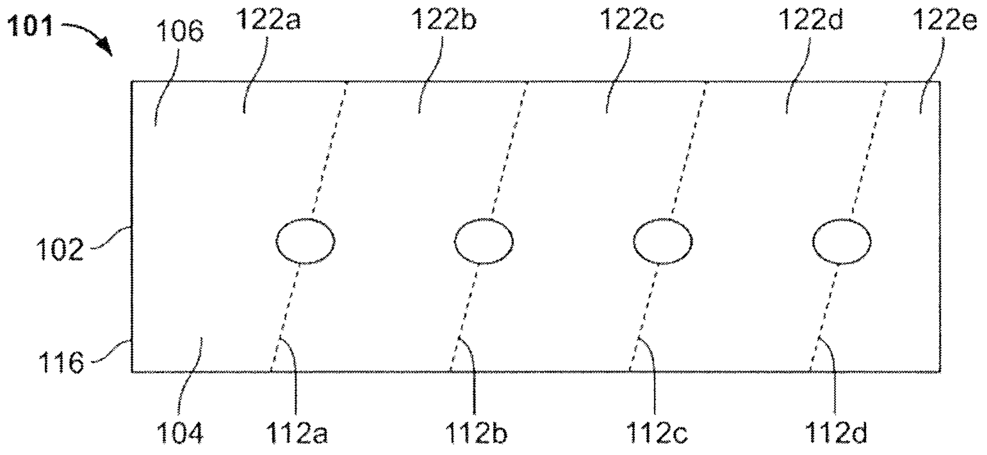
FIG. 3 is a schematic illustration of a view from above of the adhesive label support according to one embodiment of the present invention.
Figure 4:
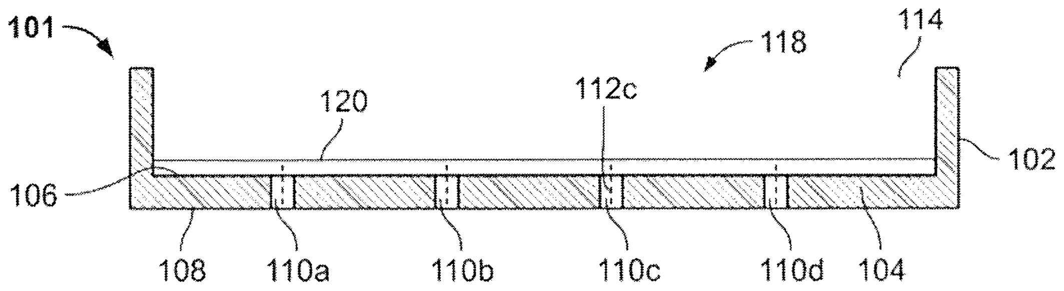
FIG. 4 is a schematic illustration of a cross-sectional view of the adhesive label of FIG. 3.

With reference to FIGS. 3 and 4, the adhesive label support 101 according to one embodiment of the present invention comprises a support frame 102 comprising a frangible support layer 104 comprising an upper surface 106 for receiving a label (not shown) thereon, an opposed lower surface 108, and four spaced apart openings 110*a-d* extending therebetween. The four opening 110*a-d* are substantially aligned and are evenly spaced along the support layer 104. It is however to be understood that the support 101 may comprise any suitable number of openings in any suitable location on the support 101 and with any suitable spacing between openings of weakness.

The label support 101 further comprises four spaced apart lines of weakness, in the form of lines of perforations, 112*a-d*. The four lines of weakness 112*a-d* are substantially equally spaced and extend parallel to each other. It is however to be understood that the label support 101 may comprise any suitable number of lines of weakness, and each line of weakness may be located in any suitable direction and may extend in any suitable direction. For example, the lines of weakness may be irregularly spaced along the support layer 104. It is also to be understood that the lines of weakness may be provided by any suitable means, such as for examples grooves, indentations, score lines or openings. The lines of weakness extend between adjacent label support portions 122*a-e*.

The support frame 102 further comprises a continuous side portion 114 extending substantially perpendicular to the upper surface 106 of the support layer 104. The continuous side portion 114 extends from and substantially surrounds the peripheral edge 116 of the support layer 104. It is however to be understood that the support frame 102 may comprise any suitable number of side portions located at any suitable location and extending at any suitable angle, and in any suitable direction, from the support layer 104.

The side portion 114 and the upper surface 106 of the support layer 104 define a recess 118 for receiving a label (not shown) thereon.

An adhesive layer 120 is located adjacent the upper surface 106 of the support layer 104. The adhesive layer 120 extends through each of the openings 110*a-d* and lines of weakness.

In use, the support 101 is adhered to a contact surface (not shown). The lower surface 108 is positioned adjacent a contact surface (not shown). The adhesive layer 120 extends through each opening 110*a-d* to adhere to the contact surface to hold the support frame 102 and the support layer 104 is position relative to the contact surface. A label is received within the recess 118 and secured therein to the adhesive layer 120.

A third party may attempt to remove the label support 101 from the contact surface on for example a vehicle without authorisation. During removal of the label support 101, the support layer 104 may be subjected to a force or tensile stress greater than the strength of the material, especially along one or more lines of weakness 112*a-d*, of the support layer 104 and/or the adhesive strength of the adhesive layer 120.

During application of tensile stress to the label 101, the frangible support layer 104 fragments along one or more line of weakness 112*a-d* providing at least one pair of separated adjacent, support layer portions 122*a-e* thereby providing a discontinuous support layer 104. Fragmentation of the support layer 104 caused distortion and/or fragmentation of the attached label providing a clear indication that the label support has been tampered with.

Figure 5:
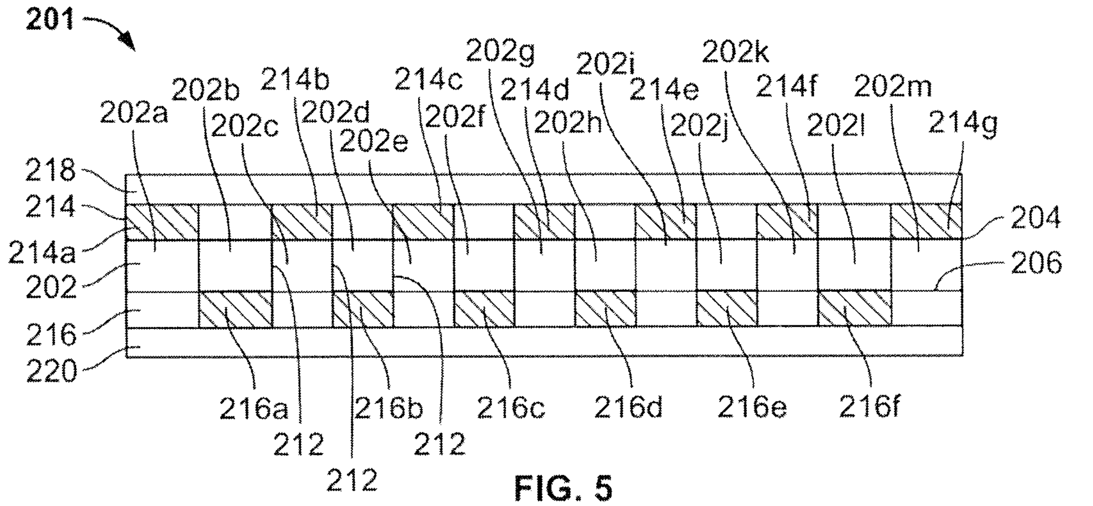
FIG. 5 is a schematic cross-section diagram of an adhesive vehicle registration label according to one embodiment of the present invention.
Figure 6:
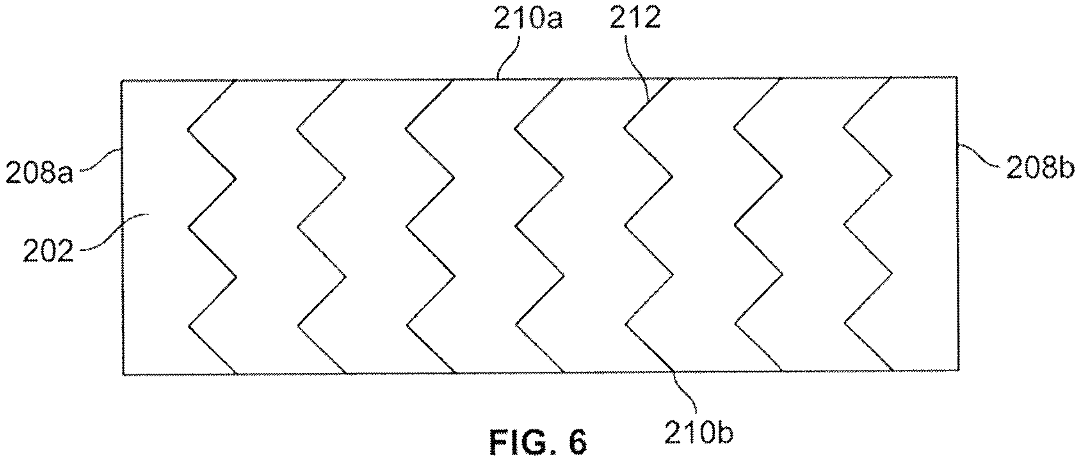
FIG. 6 is a schematic cross-section diagram from above of the label of FIG. 5.
Figure 7:
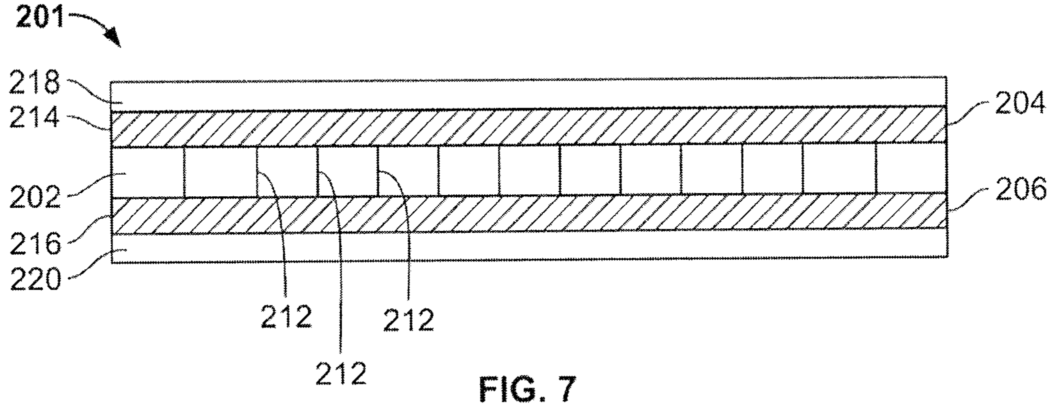
FIG. 7 is schematic cross-section diagram of an adhesive vehicle registration label according to a further embodiment of the present invention.

With reference to FIGS. 5 to 7, the adhesive vehicle registration label 201 according to one embodiment of the present invention comprises an inner layer 202 comprising a upper surface 204 and a lower surface 206. The inner layer 202 is substantially rectangular in shape. The inner layer 202 has a first pair of spaced apart, opposed transverse edges 208*a*, 208*b* and a second pair of spaced apart, opposed longitudinal edges 210*a*, 210*b*. It is however to be understood that the inner layer 202 may have any suitable shape and/or dimensions and is not to be limited to being rectangular in shape.

The inner layer 202 is reflective and contains markings corresponding to the registration details of the vehicle. The inner layer 202 is also opaque meaning that in an untampered configuration the user cannot see through the inner layer 202.

The inner layer 202 comprises a plurality of spaced apart lines of weakness 212 extending between the upper and lower surfaces 204, 206 thereof. The lines of weakness 212 divide the inner layer 202 into discrete inner layer portions 202*a*, 202*b*, 202*c*. The lines of weakness 212 are provided by perforations. It is however to be understood that the lines of weakness 212 may be provided by one or more indentations and/or scored lines and/or perforated lines, or any combination thereof extending along at least a portion of the surface. The lines of weakness 212 are uniformly spaced apart along the length (i.e. longitudinal axis extending between opposite edges 208*a*, 208*b*) of the inner layer 202. Each line of weakness 212 extends in a zigzag configuration between the second pair of opposed longitudinal edges 210*a*, 210*b*. Each line of weakness 212 extends substantially between the second pair of opposed longitudinal edges 210*a*, 210*b*. It is however to be understood that the lines of weakness 212 may be provided in any suitable configuration, orientation and/or arrangement on the inner layer 202.

A first adhesive layer 214 comprising a rubber adhesive is deposited on the upper surface 204. A second adhesive layer 216 comprising a rubber adhesive is deposited on the lower surface 206. It is to be understood that the first and/or second adhesive layer 214, 216 may comprise any suitable adhesive.

The first adhesive layer 214 is deposited as a plurality of spaced apart adhesive portions 214*a-g*. Each adhesive portion 214*a-g* is provided as a strip of adhesive extending between the second pair of longitudinal edges 210*a*, 210*b*. Each adhesive portion 214*a-g* is configured to be deposited on the upper surface 204 of a separate inner layer portion 202*a*, 202*c*, 202*e*, 202*g*, 202*i*, 202*k*, 202*m*.

The second adhesive layer 216 is deposited as a plurality of spaced apart adhesive portions 216*a-f*. Each adhesive portion 216*a-f* is provided as a strip of adhesive extending between the second pair of longitudinal edges 210*a*, 210*b*. Each adhesive portion 216*a-f* is configured to be deposited on the lower surface 206 a separate inner layer portion 202*b*, 202*d*, 202*f*, 202*h*, 202*j*, 202*l*.

It is to be understood that the first and/or second adhesive layers 214, 216 may be provided in any suitable configuration and/or arrangement on the corresponding upper and lower surfaces 204, 206 and is not to be limited to the arrangement illustrated in the Figures. FIG. 3 illustrates an alternative embodiment in which the first and second adhesive layers 214, 216 are provided as a continuous layer between opposing edges 208*a*, 208*b* of the inner layer.

An outer layer 218 is secured to the first adhesive layer 214. A removable release layer 220 is releasably secured to the second adhesive layer 216.

In use, the removable release layer 220 is removed from the second adhesive layer 216. The adhesive label 201 is aligned with the contact surface of the vehicle. The second adhesive layer 216 contacts and adheres to (by the application of pressure) the contact surface of the vehicle.

A third party may attempt to remove the adhesive label 201 from the vehicle without authorisation. During removal of the adhesive label 201 the label may be subjected to a force or tensile stress greater than the strength of the lines of weakness 212 of the inner layer 202. During application of tensile stress to the label 201, the frangible inner layer 202 fragments and/or distorts along one or more lines of weakness 212 and thereby providing a discontinuous upper surface 204 extending across the inner layer 202. The label 201 of the present invention may therefore be used to provide a label which provides clear, visible indications when the label has been tampered.

During excessive application of tensile stress to the label 201, the lines of weakness 212 may separate completely thereby fragmenting the inner layer 202. The outer layer 218, the first adhesive layer 214, and one or more inner layers portions 202*a-c* may separate from one or more separate inner layer portions 202*a-c* and the second adhesive layer 216 thereby ensuring that only part of the label 201 is removed from the contact surface of the vehicle and ensuring a portion of the label 201 remains on the contact surface of the vehicle. The label 201 of the present invention therefore makes it difficult, if not impossible, to remove a complete inner layer 202 of the label 201 from a contact surface of a vehicle thereby ensuring the label 201 cannot be transferred and reused on a different vehicle.

The invention claimed is:

1. An adhesive tamper evident label support, in which the adhesive tamper evident label support comprises:

a frangible support layer for receiving a label, the frangible support layer comprising an upper surface for receiving a label thereon, and an opposed lower surface, in which the frangible support layer comprises a plurality of support layer portions located adjacent to each other and separable from each other by at least one opening and/or line of weakness extending between the upper and lower surfaces of the support layer; and an adhesive layer located in use on the lower surface of the frangible support layer and configured to adhere the frangible support layer to a contact surface;

in which the frangible support layer of the adhesive tamper evident label support is moveable between a first untampered position in which the support layer portions provide a continuous surface extending across the upper surface thereof, and a second tampered position in which at least a pair of adjacent support layer portions are separated from each other along the corresponding at least one opening and/or line of weakness, and in which the adhesive tamper evident label support comprises a support frame comprising the frangible support layer, and at least one side portion extending outwardly therefrom.

2. The adhesive tamper evident label support as claimed in claim 1, in which the adhesive layer extends through the at least one opening and/or line of weakness for adhesion to a contact surface.

3. The adhesive tamper evident label support as claimed in claim 1, in which the one or more lines of weakness comprise one or more of: lines of indentations and/or perforations and/or openings and/or scored lines, or any combination thereof.

4. The adhesive tamper evident label support as claimed in claim 1, in which the support layer defines a perimeter edge substantially surrounding the lower surface and/or upper surface, and in which the at least one side portion is upstanding from or adjacent a perimeter edge of at least one of: the lower surface and/or upper surface of the support layer.

5. The adhesive tamper evident label support as claimed in claim 1, in which an at least one line of weakness extends across the upper surface of the support layer and across at least one side portion.

* * * * *